United States Patent [19]
Charbonneau et al.

[11] Patent Number: 5,139,666
[45] Date of Patent: Aug. 18, 1992

[54] BOTTLE AND FILTER

[75] Inventors: Guy L. Charbonneau, St-Lambert; Alan H. Bowler, Ontario, both of Canada; Edward W. Bock, Fridley, Minn.

[73] Assignee: Domotechnica Canada, Inc., Quebec, Canada

[21] Appl. No.: 638,354

[22] Filed: Jan. 4, 1991

[51] Int. Cl.⁵ .............................................. B01D 35/04
[52] U.S. Cl. .................................... 210/264; 210/282; 210/416.3; 210/466; 210/469; 210/475; 215/31; 215/308; 220/371; 222/189
[58] Field of Search ............ 210/263, 264, 282, 416.3, 210/464, 466, 467, 469, 475; 215/31, 308, 309; 220/371, 372; 222/189, 481

[56] References Cited

U.S. PATENT DOCUMENTS

| | | |
|---|---|---|
| D. 303,496 | 9/1989 | Larson . |
| D. 303,497 | 9/1989 | Larson . |
| D. 307,389 | 4/1990 | Larson . |
| D. 308,794 | 6/1990 | Larson . |
| D. 309,231 | 7/1990 | Larson . |
| 672,692 | 4/1901 | Bailey . |
| 690,457 | 1/1902 | Parker . |
| 707,873 | 8/1902 | Spencer . |
| 738,032 | 9/1903 | Harrison . |
| 1,019,171 | 3/1912 | Melville-Hamilton . |
| 1,157,776 | 10/1915 | Hagg . |
| 1,331,409 | 2/1920 | Barnett . |
| 1,943,314 | 1/1934 | Hathersall ........................... 222/481 |
| 2,372,340 | 3/1945 | Senyal . |
| 2,389,185 | 11/1945 | Dick . |
| 2,456,524 | 12/1948 | Meincke, Jr. . |
| 2,761,833 | 9/1956 | Ward . |
| 2,781,312 | 2/1957 | Klumb et al. . |
| 2,869,724 | 1/1959 | McDevitt . |
| 3,105,613 | 10/1963 | Barton et al. ....................... 222/481 |
| 3,156,383 | 11/1964 | Melli . |
| 3,335,917 | 8/1967 | Knight . |
| 3,392,837 | 7/1968 | Sanzenbacher . |
| 3,422,993 | 1/1969 | Boehm et al. . |
| 3,446,179 | 5/1969 | Bender ................................ 116/308 |
| 3,840,153 | 10/1974 | Devlin . |
| 3,951,798 | 4/1976 | Haldopoulos . |
| 3,977,560 | 8/1976 | Stumpf et al. . |
| 4,024,991 | 5/1977 | Tyson et al. . |
| 4,044,923 | 8/1977 | Gardner . |
| 4,181,243 | 1/1980 | Frahm . |
| 4,259,184 | 3/1981 | D'Arnal . |
| 4,419,235 | 12/1983 | Sway . |
| 4,555,336 | 11/1985 | Nugent et al. . |
| 4,605,499 | 8/1986 | Wise . |
| 4,658,975 | 4/1987 | Cone . |
| 4,695,379 | 9/1987 | Nohren, Jr. et al. . |
| 4,714,550 | 12/1987 | Malson et al. . |
| 4,733,804 | 3/1988 | Slat et al. ............................ 222/481 |
| 4,762,613 | 8/1988 | Snowball . |
| 4,764,274 | 8/1988 | Miller . |
| 4,805,808 | 2/1989 | Larson . |
| 4,834,267 | 5/1989 | Schroer et al. ...................... 222/189 |
| 4,856,664 | 8/1989 | Gillispie et al. . |
| 4,860,927 | 8/1989 | Grinde . |
| 4,880,140 | 11/1989 | Solomon et al. . |
| 4,938,389 | 7/1990 | Rassi et al. ......................... 222/189 |
| 4,951,845 | 8/1990 | Pezzoli et al. ...................... 215/309 |
| 4,969,571 | 11/1990 | Bartz . |
| 4,969,996 | 11/1990 | Hankammer . |

FOREIGN PATENT DOCUMENTS 1465560 1/1967 France .
1565679 5/1969 France .

Primary Examiner—Robert A. Dawson
Assistant Examiner—W. L. Millard
Attorney, Agent, or Firm—Burd, Bartz & Gutenkauf

[57] ABSTRACT

A water dispenser supports a bottle having a filter neck accommodating a water filter and a fill neck closed with a cap equipped with a water refill counter. The cap can be removed from the fill neck to allow the bottle to be filled with water without removing the filter from the filter neck. The filter neck has a plurality of inwardly directed projections that are engaged by the filter to position the filter in the filter neck and prevent the filter from being pushed into the chamber of the bottle. A ring having an air bleed hole mounted on the filter neck engages the filter to retain the filter on the filter neck.

39 Claims, 14 Drawing Sheets

BOTTLE AND FILTER

TECHNICAL FIELD

The technology of the invention relates to drinking water dispensers having bottles for storing water and filters associated with the bottles for filtering water flowing from the bottles into the dispensers.

BACKGROUND OF THE INVENTION

Portable water dispensers using bottled water have been in use for a number of years. When the water in the bottle has been dispensed, the empty bottle is replaced with a full bottle of water. Bottled water can be natural water or purified water processed at a location remote from the point of use. The processing and handling of bottled water is costly and not economically available to all persons. Community or rural water can be used in the bottles to supply water for the dispensers. While community water utilities treat water to meet minimum standards for purity, persons that depend on private wells and other water sources have no assurance of water purity. Filtering devices provided with activated carbon, mechanical filters, reverse osmosis systems and ultraviolet light have been used to treat water. These devices are installed on point of entry locations as water taps or incorporated in portable containers or canteens. Examples of portable containers equipped with water conditioning devices are disclosed by W. A. Sanzenbacher in U.S. Pat. No. 3,392,837 issued Jul. 16, 1968 and W. S. Malson and J. W. Sharpe in U.S. Pat. No. 4,714,550 issued Dec. 22, 1987. These containers cannot be inverted and used with a water dispenser according to the invention disclosed herein. The bottle and filter of the invention can use community and well water which is filtered to remove contaminants prior to the dispensing into a drinking container.

SUMMARY OF THE INVENTION

The invention comprises a bottle for storing liquid, such as drinking water, for use with a water dispenser having a seat for holding an inverted bottle to provide the dispenser with a supply of filtered water. The bottle has a side wall joined to top and bottom walls providing a chamber for accommodating water. The top wall has a first neck having a passage open to the chamber and structures extended into the passage to position a filter in the passage. The filter functions to remove contaminants and other substances from the water as the water flows through the filter from the chamber into the dispenser. A second neck spaced from the first neck and joined to the top wall has an opening into the chamber to allow water to be placed into the chamber without removing the filter from the bottle or forcing water through the filter. A cap is removably mounted on the second neck to close the opening so that when the bottle is inverted on the dispenser water only flows from the chamber of the bottle through the filter into the dispenser.

One embodiment of the bottle has a first tubular neck having a plurality of inwardly directed circumferentially spaced projections that function as stops to prevent the filter from being moved into the chamber. The filter has an inlet end open to the chamber, an outlet end open to the dispenser, and filtering material located between the inlet and outlet ends for removing contaminants and other substances from the water flowing through the filtering material into the dispenser. An outwardly directed flange on the filter engages the projections on the first neck to position the filter in the first neck. A ring member releasably mounted on the first neck engages the filter to retain the filter on the first neck. The ring member has a small air bleed hole open to the passage to allow air to flow from the dispenser into the bottle chamber to replace water flowing from the chamber and to permit optimum water flow rate through the filter for efficient removal of the contaminants. The filter can be removed from the first neck by removing the ring member from the first neck. A new filter is then inserted into the passage of the first neck until the flange thereon engages the projections. The ring member has an annular inside edge that engages the filter to retain the filter on the first neck and close the passage therein except for the air bleed hole.

The cap used to close the opening in the second neck can be equipped with a water refill counter operable to indicate the number of times the bottle has been filled with water. The filter can be effective to remove contaminants from six to ten or more bottles of water. The counter has a movable member and indicia used to provide the user with information such as the number of bottles of water that have been filtered by the filter material. When the selected number of bottles of water have been filtered, the filter is removed from the first neck and replaced with a new filter.

Another embodiment of the bottle has a recess in the top wall accommodating the second neck and cap thereon. The second neck and cap located within the recess inwardly of the outer annular surface of the top wall does not interfere with the seating of the inverted bottle on the dispenser.

DESCRIPTION OF PREFERRED EMBODIMENTS

Figure 1:
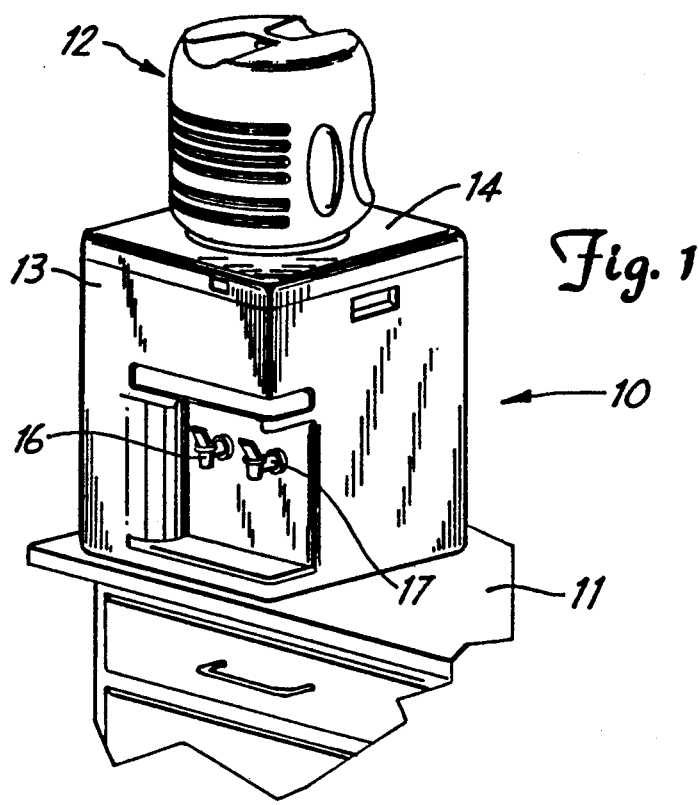
FIG. 1 is a perspective view of a liquid dispenser supporting the bottle and filter of the invention.
Figure 2:
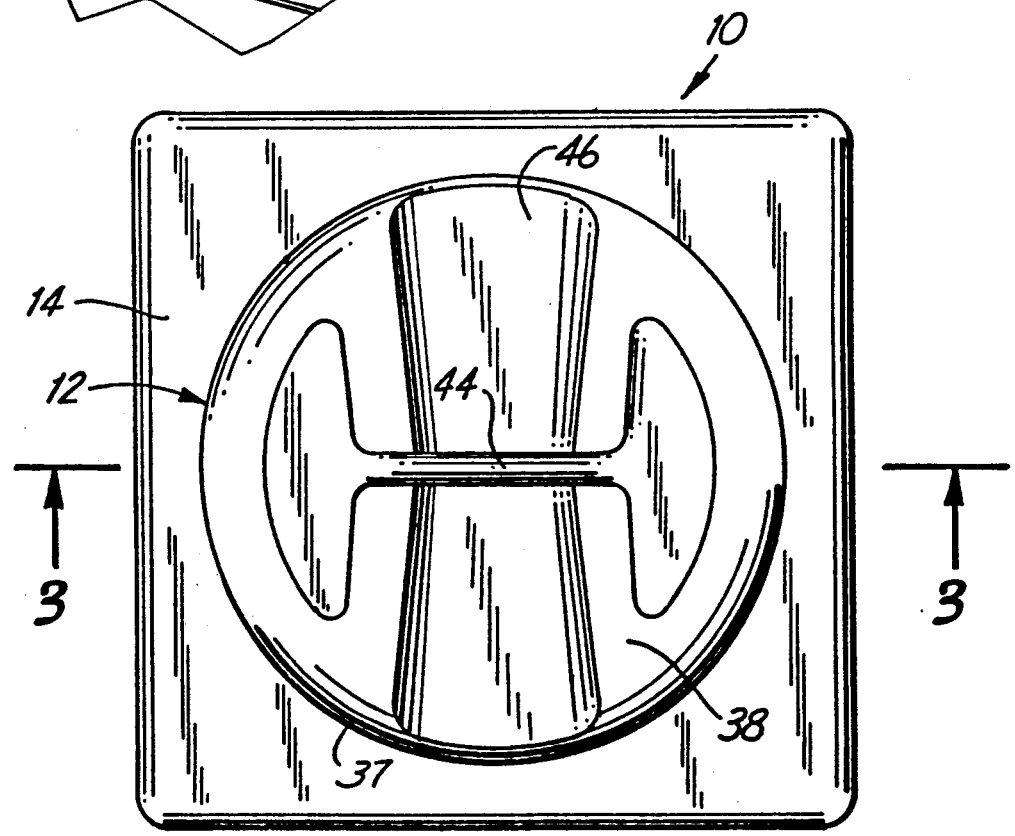
FIG. 2 is an enlarged top view of FIG. 1.

Referring to FIG. 1, there is shown a liquid dispenser, indicated generally at 10, supported on a table or counter 11. An inverted bottle, indicated generally at 12, storing liquid, such as water, is mounted on top of dispenser 10. The liquid stored in the bottles disclosed herein is drinking water. Other types of liquids and mixtures of liquids can be accommodated by the bottles. Dispenser 10 includes a generally rectangular cabinet 13 having a top wall 14 enclosing a chamber for accommodating cooling coils and/or heating coils (not shown) for cooling or heating the water. The front of the cabinet has a pair of hand operating valves 16 and 17 which are manually operated to allow either hot or cold water to flow into a glass or cup. The dispenser 10 is a commercial product and does not form part of the invention. Other types of liquid dispensers can be used with the bottle of the invention. An example of another water dispenser for supporting a bottle is shown by R. L. Larson in U.S. Pat. No. 4,805,808.

Figure 3:
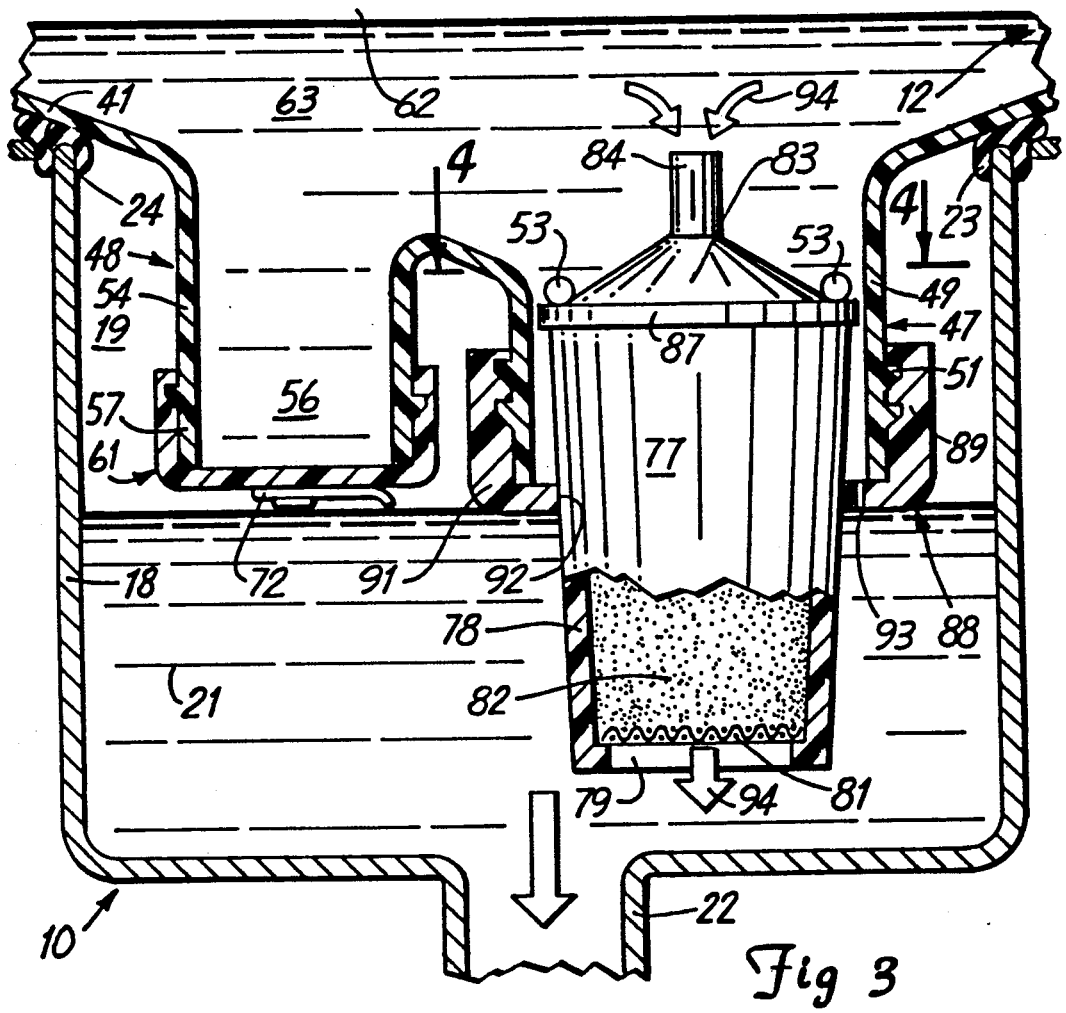
FIG. 3 is an enlarged sectional view taken along line 3—3 of FIG. 2.

Referring to FIG. 3, dispenser 10 also has a tank 18 open to top wall 14. Tank 18 has a chamber 19 for accommodating water 21. The bottom of the tank has an outlet 22 connected to valves 16 and 17. The top wall 14 has a circular hole that accommodates the upper end of tank 18. An annular seal 23 of rubber or plastic fits over the top of tank 18 and rests on top wall 14 providing an annular support surface 24 for bottle 12.

Referring to FIGS. 3 and 7 to 11, bottle 12 is a one piece blow molded plastic container having an annular side wall 26 provided with a plurality of arcuate reinforcing grooves 27, 28, 29, 30, 31 and 32. The grooves 27 to 32 are separated with arcuate ribs 33, 34, 35 and 36. The grooves and ribs have an arcuate extent of approximately 270 degrees around the outer surface of side wall 26 to strengthen wall 26. The lower portion of bottle 12 has a bottom section 37 that converges inwardly into a generally flat bottom wall 38 to permit bottle 12 to rest stably on a flat support. Bottom section 37 has a smooth radius that merges the side wall 26 with bottom wall 38 to strengthen the walls 26 and 38. The upper portion of side wall 26 has a corner section 39 that curves into an upwardly directed concaved shaped top wall 41. The walls 26, 38 and 41 are plastic and have substantially uniform thickness with curved connecting sections which eliminates sharp corners and thin walls that can develop cracks and holes that allow air into the bottle chamber 62. In the event that unrestricted air is allowed to flow into bottle chamber 62, the water therein will flow into dispenser 10 until the bottle 12 is empty.

Figure 8:
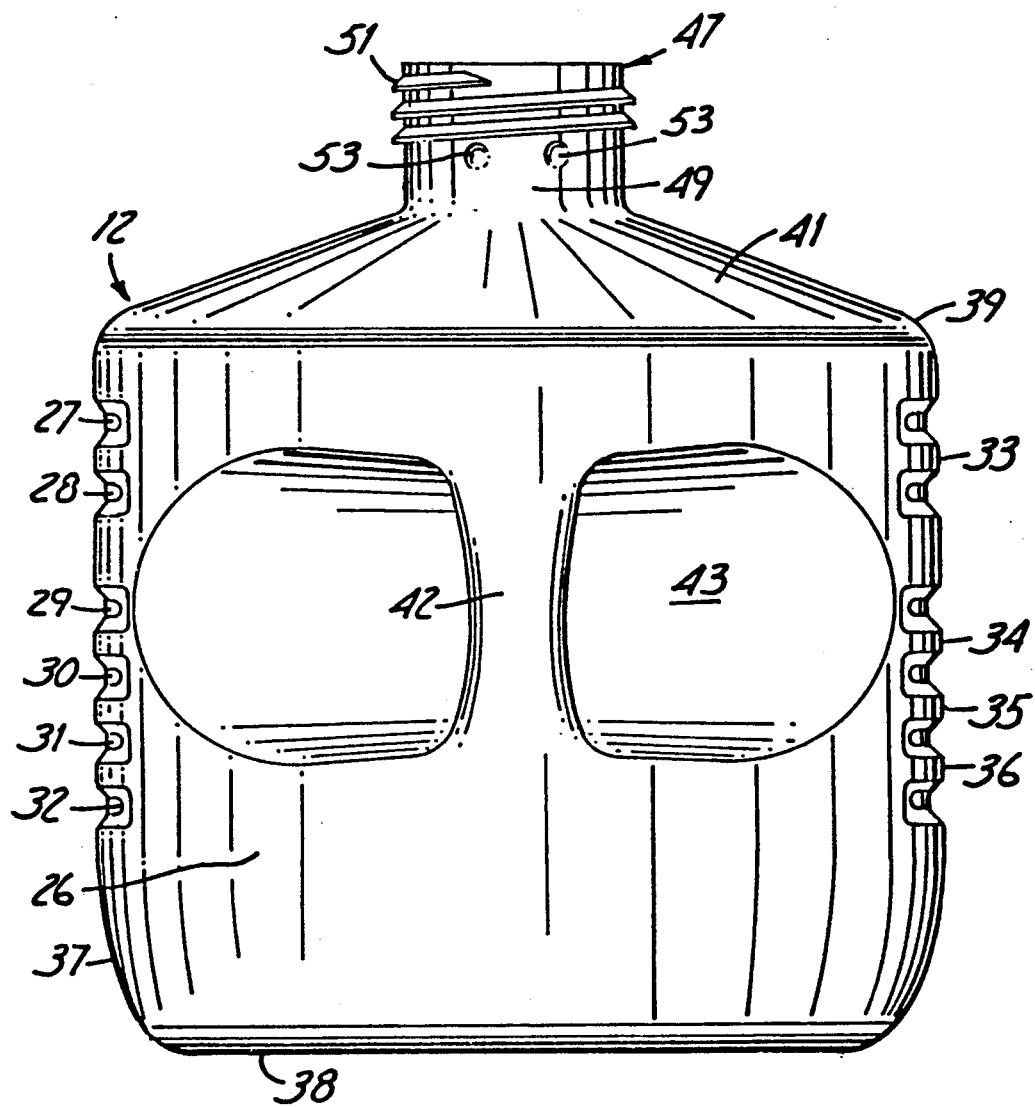
FIG. 8 is a rear elevational view of the bottle showing the side handle.
Figure 9:
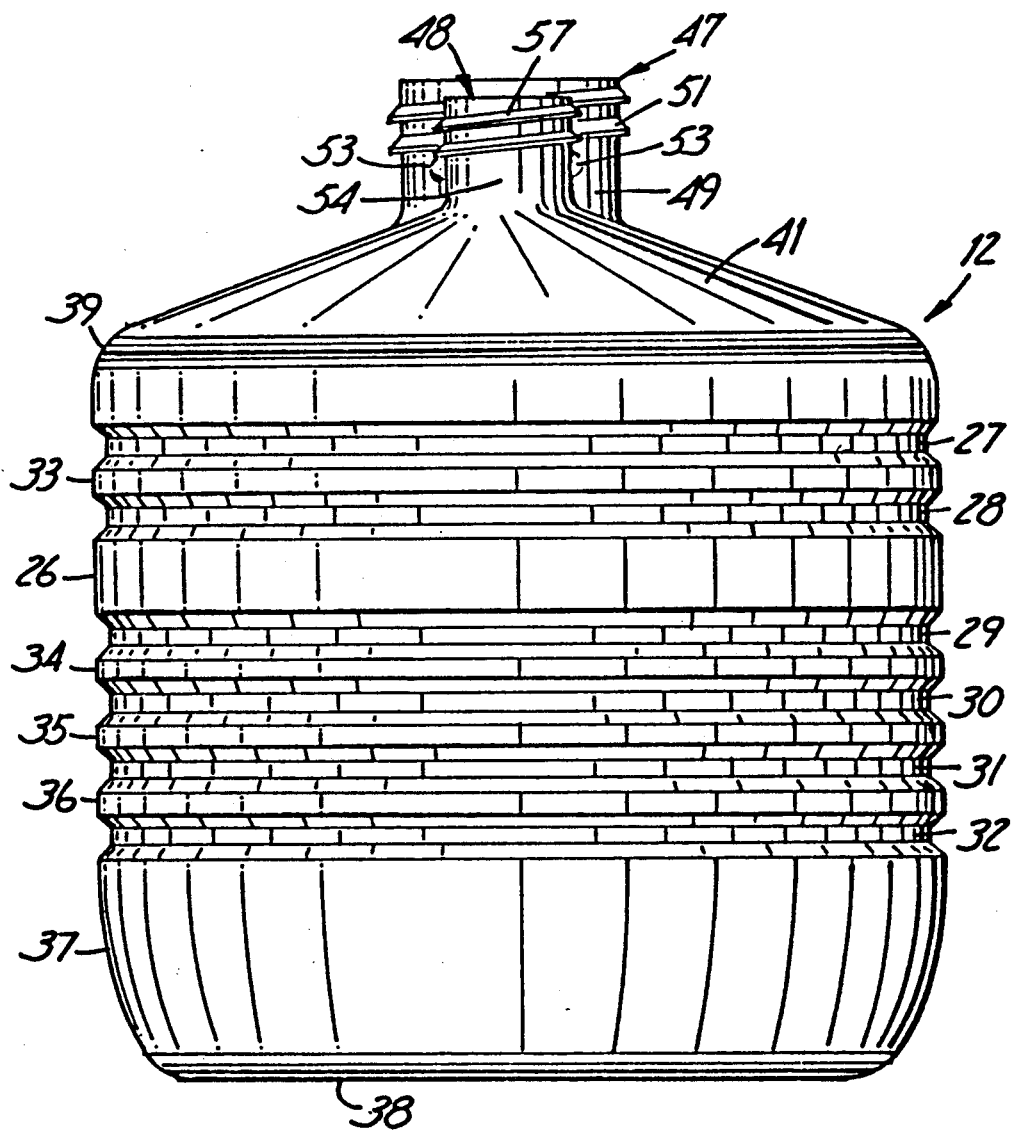
FIG. 9 is a front elevational view of the bottle.
Figure 10:
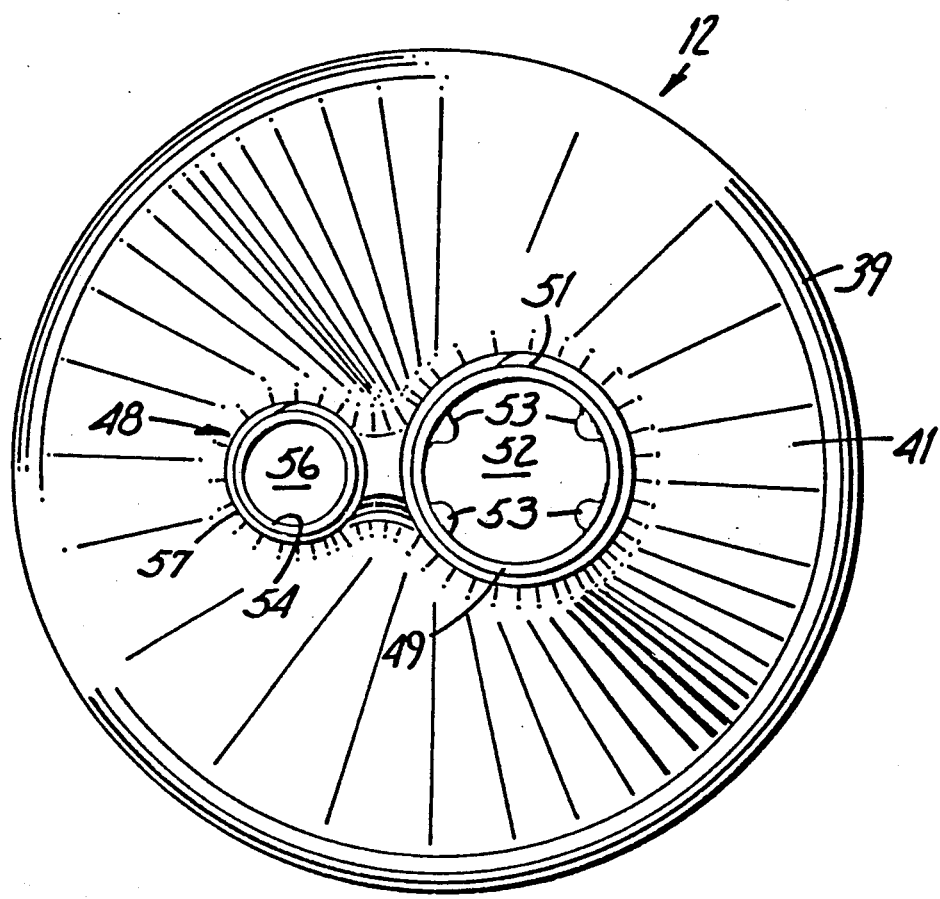
FIG. 10 is a top view of the bottle.

Side wall 26 has a first or side upright handle 42 spanning a recess 43 of a size to accommodate the fingers of a hand. Handle 42 is located generally in the mid-section of side wall 26 opposite ribs 33 to 36. As seen in FIG. 8, recess 43 has a generally oval shape and extends in opposite circumferential directions on opposite sides of handle 42. The outer surface of handle 42 is concentric with the outer surface of side wall 26 thereby providing bottle 12 with an overall cylindrical configuration which minimizes packaging and retail shelf space.

Figure 11:
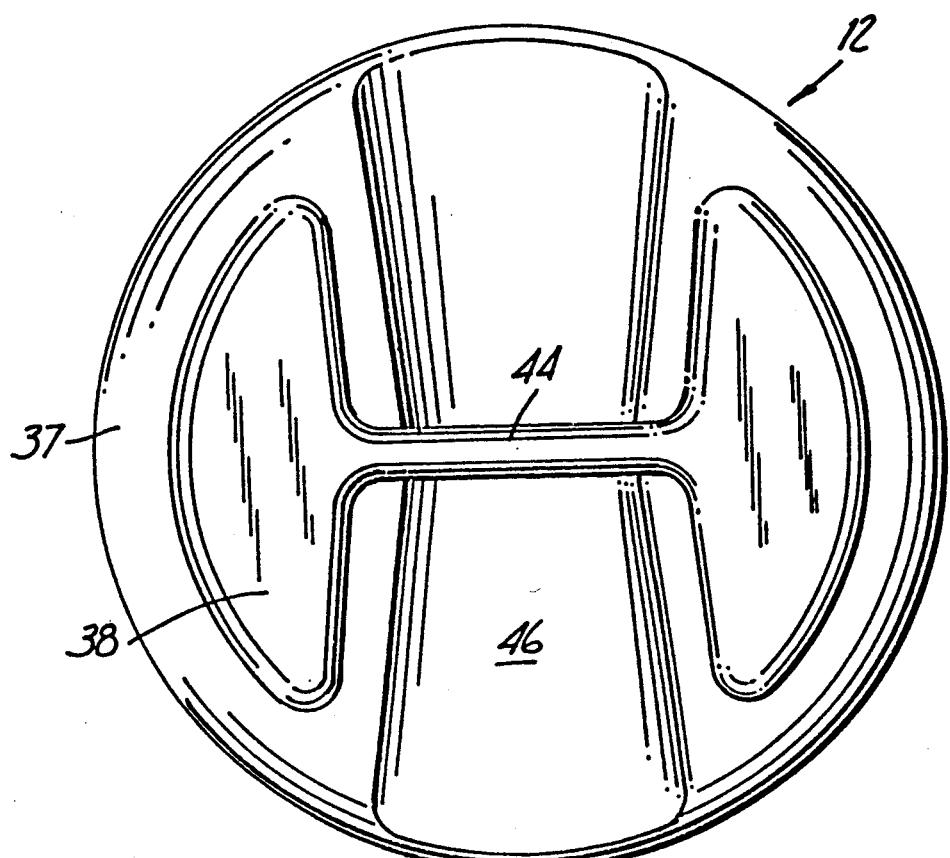
FIG. 11 is a bottom view of the bottle.

Bottom wall 38 has a second or bottom handle 44 spanning a recess 46. As shown in FIG. 11, recess 46 extends diametrically across the bottom wall 38 providing open ends allowing access of the hand to handle 44 from either side of bottle 12. Returning to FIG. 7, handles 42 and 44 are located in the same vertical plane with handle 42 in an upright or vertical position and handle 44 in a horizontal or transverse position across the mid-section of bottom wall 38. Handles 42 and 44 are used to hand manipulate bottle 12 and aid in the inverting of the bottle 12 onto dispenser 10 with top wall 41 in annular surface engagement with seal surface 24.

Figure 4:
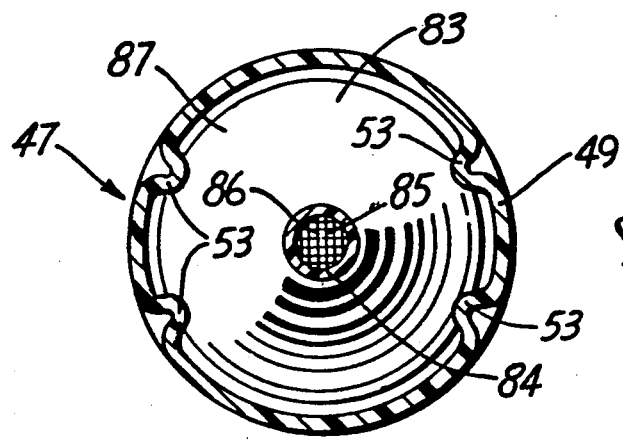
FIG. 4 is an enlarged sectional view taken along line 4—4 of FIG. 3.

As shown in FIGS. 3 and 7, 9 and 10, a filter neck and fill neck, indicated generally at 47 and 48 respectively, are joined to top wall 41 and project upwardly therefrom. FIG. 3 shows bottle 12 in the inverted water dispensing position. Filter neck 47 has a tubular cylindrical wall 49 having external threads 51 surrounding a passage 52 open to the inside chamber 62 of bottle 12. A plurality of short fingers or projections 53 joined to wall 49 project into passage 52. As shown in FIG. 4, projections 53 are indented portions of wall 49 circumferentially spaced around wall 49. The stop function of projections 53 are hereinafter described.

Fill neck 48 has an annular wall 54 surrounding a passage 56 open to the chamber of bottle 12 to allow water to flow into the chamber to fill bottle 12 with water. Wall 54 has a diameter smaller than the diameter of wall 49 and a height smaller than the height of wall 49. Walls 49 and 54 are tubular extensions of top wall 41 offset from the central longitudinal axis of bottle 12. The axes of passages 52 and 56 are parallel with and on opposite sides of the central longitudinal axis of bottle 12. The opposite outer sides of walls 49 and 54 are about equidistant from the central longitudinal axis of bottle 12 leaving top wall 41 with a substantial annular surface adapted to engage seals, such as seal 23, of different diameters.

Figure 5:
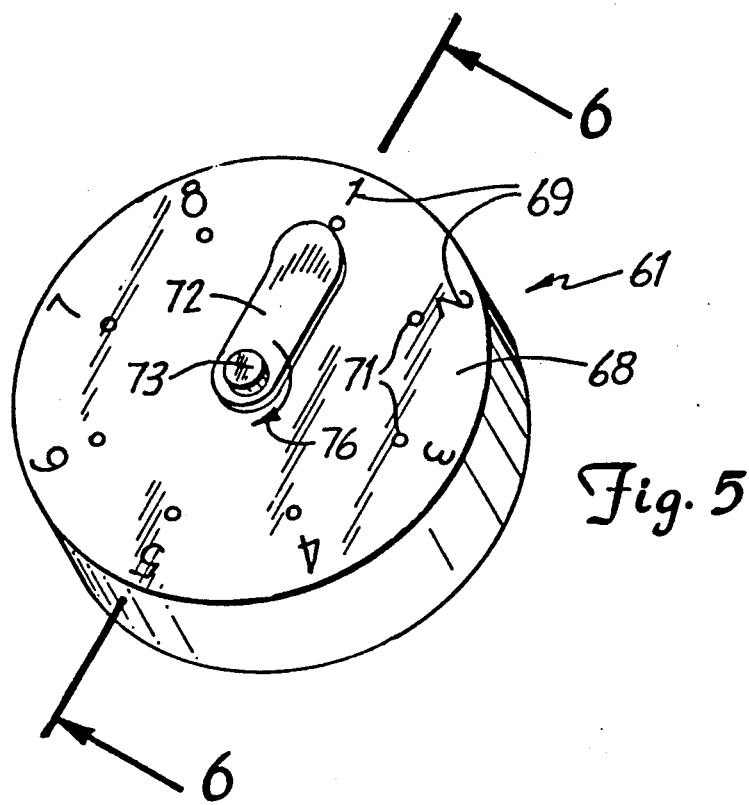
FIG. 5 is a perspective view of the indicator cap for the liquid fill hole of the bottle.
Figure 6:
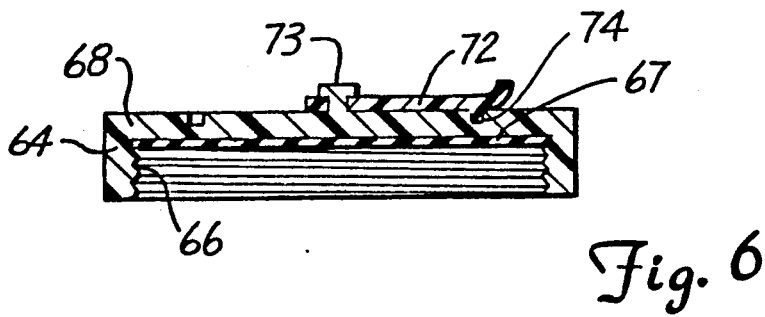
FIG. 6 is a sectional view taken along the line 6—6 of FIG. 5.
Figure 7:
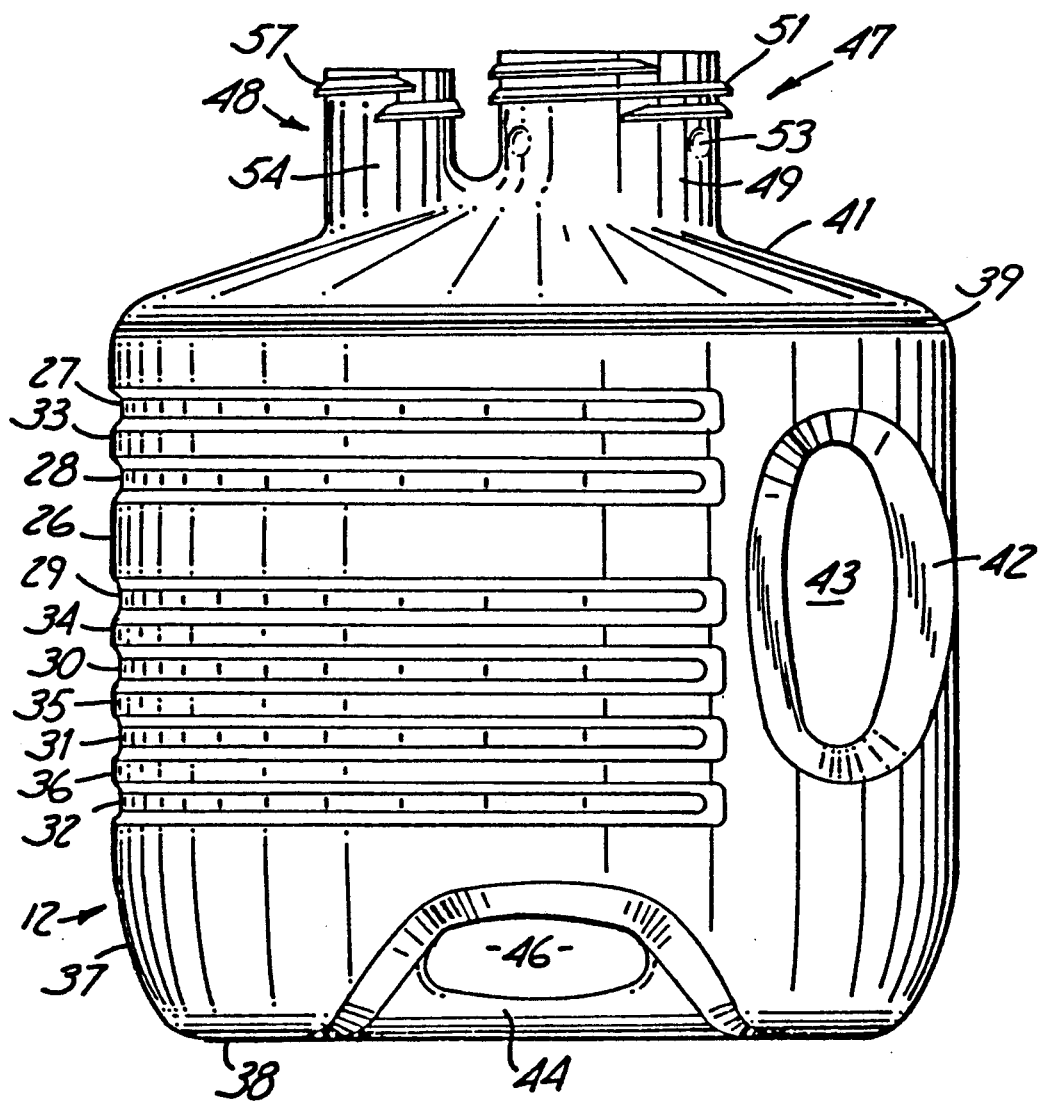
FIG. 7 is a side elevational view of the bottle without the liquid filter and fill cap.

A cap, indicated generally at 61, is turned onto threads 57 to close passage 56 to retain water in the bottle 12. Cap 61 includes a refill counter used to show the number of times that the bottle has been filled with water. Referring to FIGS. 5 and 6, cap 61 has a generally cylindrical body 64 with internal threads 66 which cooperate with threads 57 to hold cap 61 on wall 54. The inside of body 64 has a seal 67 which engages the outer end of wall 54 when cap 61 is turned onto threads 57 to prevent water from leaking from and the entrance of air into bottle 12. Body 64 has a generally circular top wall 68 provided with a plurality of numbers 69 shown as 1 to 8. The numbers 69 are circumferentially spaced from each other to provide indicia used to indicate the number of times that bottle 12 has been filled with water. Top wall 68 has a plurality of holes or depressions 71 adjacent each number. Rotatably mounted on top wall 68 is a generally flat pointer 72. A button 73 joined to the center of top wall 68 rotatably secures pointer 72 to top wall 68. The outer end of pointer 72 has an inwardly directed projection or finger 74 adapted to fit into a hole 71 thereby fixing the location of pointer 72 adjacent a desired number. Pointer 72 can be rotated as indicated by the arrow 76 in FIG. 5 by lifting pointer 72 away from top wall 69 and moving pointer 72 to the next number. Finger 74 will be biased into a hole 71 thereby fixing the position of pointer 72 adjacent the number. Pointer 72 is moved to the adjacent number each time bottle 12 is refilled with the water to provide the user with information as to the volume of water that has passed through the filter, indicated generally at 77.

Other types of counters can be used with cap 61 to keep track of the number of water refills used with a single filter. Returning to FIG. 3, filter 77 has a generally cylindrical casing 78 with an open bottom 79. A fine screen 81 extends across bottom 79 to retain water filtering material 82 within casing 78. The filtering material 82 can function to remove from water minerals, salts, particulates, pediments, nitrates, chemical contaminants, chlorine, chloramines, trihalomethanes, and objectionable taste, color, and odors, herein broadly called contaminants. Some filtering materials, such as fibrous material, porous ceramics or diatomaceous earth, can remove bacteria and asbestos fibers from water. An example of a water filtering material is a mineral and activated carbon mixture with activated carbon particles coated with silver to control bacterial buildup in the filtering material. The filtering material can be selected for the particular contaminants that are present in the water.

The top of casing 78 is closed with a cover 83 having a water inlet tube 84. Tube 84 has a passage 85 which allows water to flow from bottle 12 through filtering material 82. A screen 86, shown in FIG. 4, extends across passage 85 to retain filtering material 82 within casing 78. Cover 83 has an outwardly projected annular flange 87 that fits into passage 52 of neck 47 and engages projections 53 which function as stops preventing filter 77 from being pushed into bottle chamber 62. The filter 77 is retained on neck 47 with an annular cap or ring member indicated generally at 88. Ring member 88 has an annular side sleeve 89 with internal threads that cooperate with threads 51 on neck 47 to releasably hold ring member 88 on neck 47. An annular wall 91 having an internal tapered edge 92 is joined to sleeve 89. Edge 92 engages the outside surface of casing 78 to center filter 77 on neck 47, hold flange 87 in engagement with projections 53, and close passage 52 except an air bleed hole 93. Wall 91 has small air bleed hole 93 which permits air to flow into bottle chamber 62 when the level of the water 21 in tank 18 falls below wall 91 thereby allowing water to flow from chamber 62, through filter material 82, into tank chamber 19 as indicated by arrows 94.

Bottle 12 is used as a supply of filtered water for dispenser 10. The water can be treated or filtered water or conventional tap water. Passage 52 in neck 47 is closed with filter 77. Ring 88 is threaded onto the neck 47 to hold filter 77 in an engagement with the inwardly directed projections 53 which function as stops preventing filter 77 from being pushed into bottle 12. Ring 88 can be readily removed so that filter 77 can be replaced with a new filter.

Cap 61 is removed from fill neck 48 to provide access into chamber 62. Water from a tap or container flows through opening 56 into chamber 62. When bottle 12 is full of water, cap 61 is placed back on neck 48 to close opening 56. Pointer 72 is initially placed at number 1 to indicate the first bottle of water that flows through filter 77.

Bottle 12 is then placed on dispenser 10 by inverting the bottle and nesting top wall 41 on annular seal 23. Ring 88 along with neck 47 extends downwardly into tank chamber 19. Water 63 in bottle 12 flows through filter 77 as indicated by the arrows 94 in FIG. 3 and collects in tank 18. The air flows through the air hole 93 in ring 88 to replace the water in chamber 62. The water will continue to flow into tank 18 until the level of the water rises above the air hole 93. When the level of water 21 in tank 18 falls below the air hole 93, air will flow up and through hole 93 into chamber 62. A supply of water will then flow through filter 77 to raise the level of the water 21 in tank 18. This water dispensing procedure is repeated until the supply of water 62 in bottle 12 reaches the level of water 21 in tank 18. Bottle 12 is then removed from dispenser 10 and refilled with water. The pointer 72 is then moved to number 2 to indicate that a second bottle of water is being filtered by filter material 82. When a selected number of bottles of water have been filtered with filter material 82, for example 8 bottles of water, the effectiveness of filtering material 82 in the filter 77 may be reduced to a point where a new filter should be placed in the bottle. Ring 88 is removed from neck 47 to expose the end of filter 77. Filter 77 can then be withdrawn from the neck 47 and disposed of in an environment compatible manner. A new filter is then inserted into the opening 52 of neck 47. Ring 88 is turned back onto neck 47 to retain the new filter in engagement with projections 53 to fix the position of the filter in the neck 47.

A bottle having a filter neck for accommodating a water filter and a fill neck used to fill the bottle with water without removing the filter for use with a water dispenser has been shown and described. The size and shape of the side wall and bottom of a bottle having the disclosed filter neck and fill neck can vary. Examples of other bottle configurations having a filter neck and fill neck are shown in U.S. patent application Ser. No. 621,546 and Ser. No. 629,345 incorporated herein by reference. The following described bottle 112 is a further example of a modification of the invention wherein the top wall of the bottle has a filter neck and a separate opening to allow the bottle to be filled with water without removing the filter.

Figure 12:
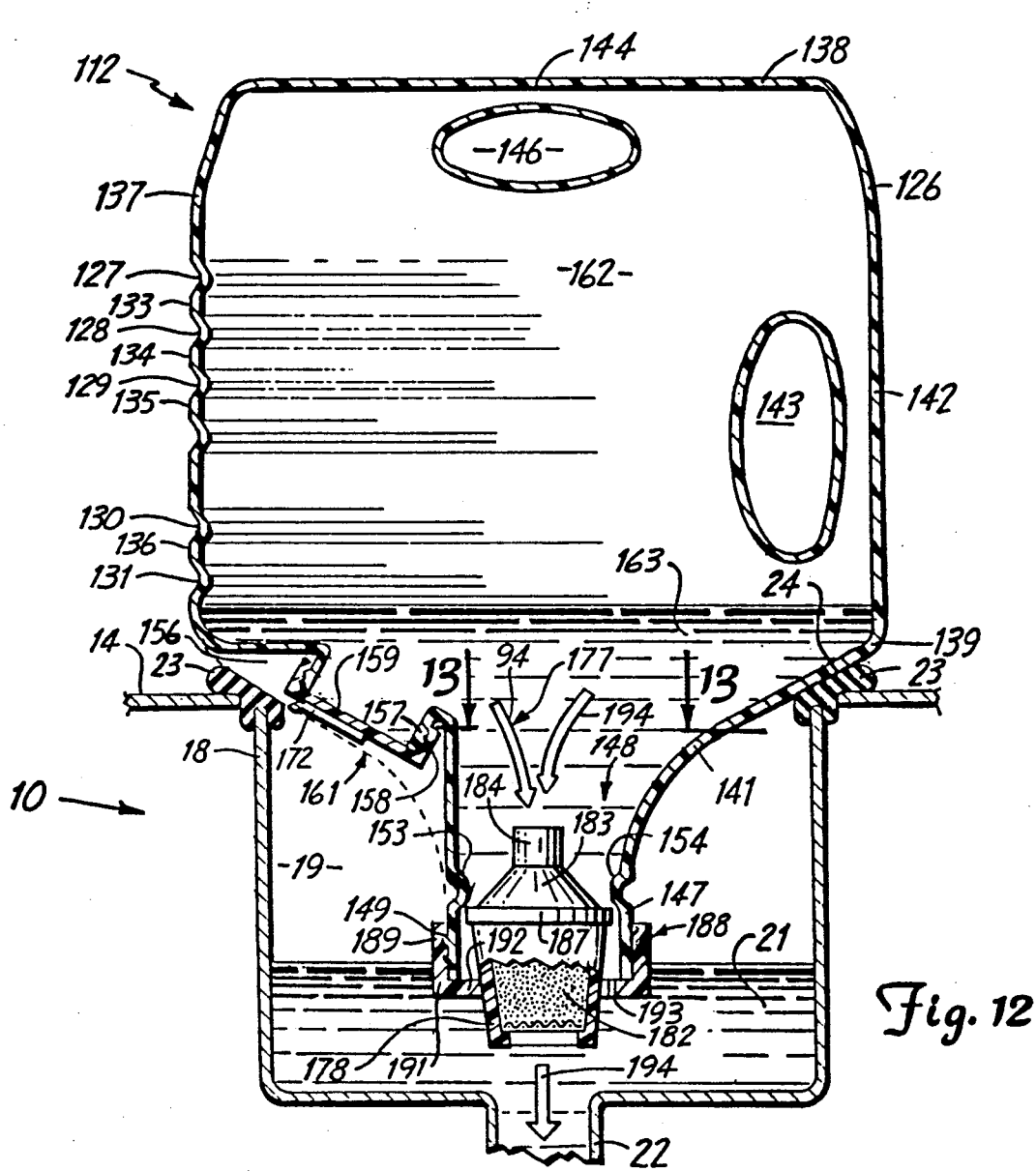
FIG. 12 is a sectional view similar to FIG. 3 of a modification of the bottle and filter.
Figure 15:
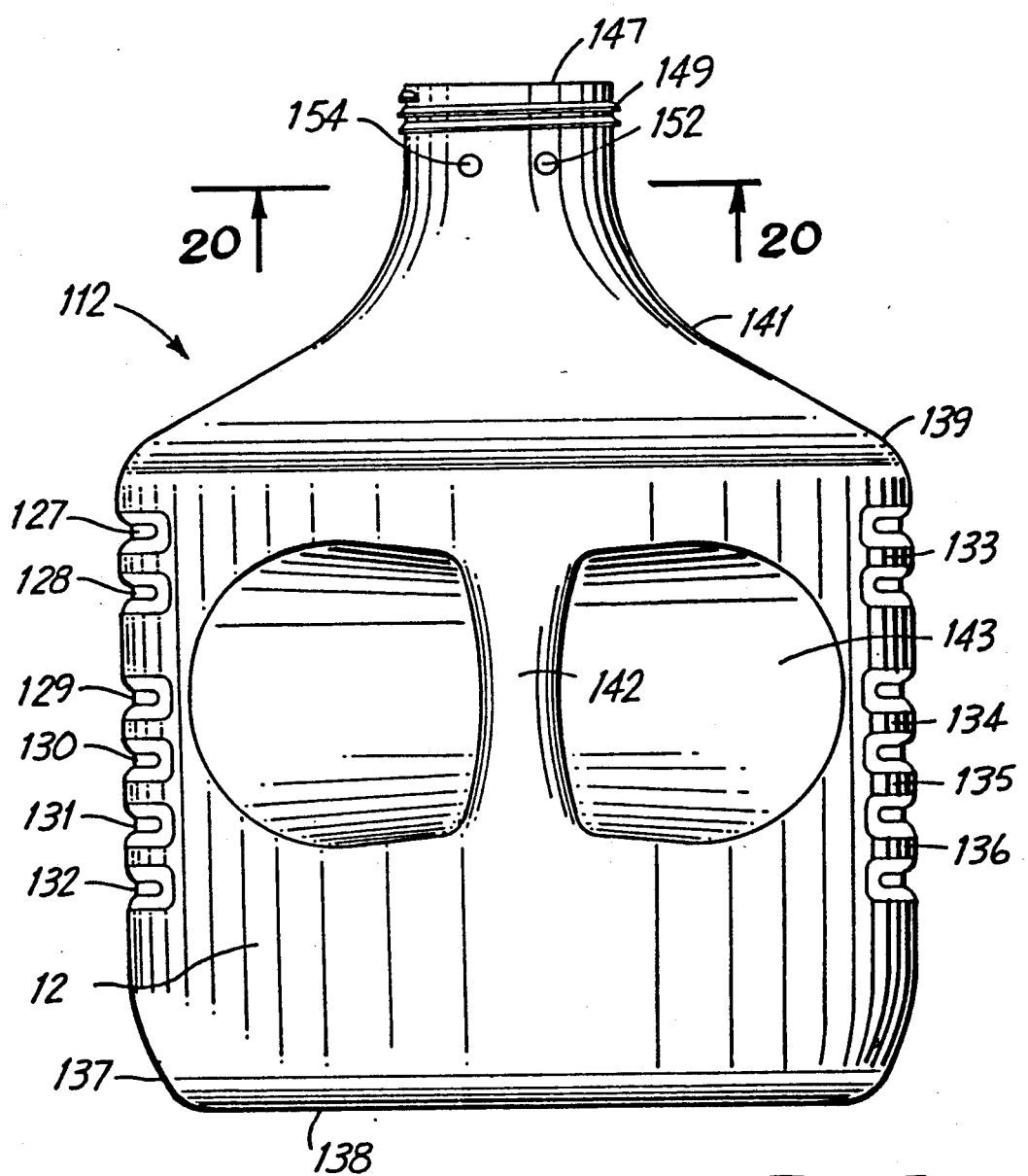
FIG. 15 is a rear elevational view of the bottle of FIG. 14 showing the side handle.

Referring to FIG. 12, bottle 112 is a one piece blow molded plastic container having an annular side wall 126 provided with a plurality of arcuate grooves 127, 28, 129, 130; 131 and 142. The grooves are separated with arcuate ribs 33, 134, 135 and 136. The grooves 127-132 and ribs 133 136 have an arcuate extent of approximately 270 degrees around the outer surface of side wall 126 to reinforce side wall 126. The lower portion of bottle 112 has a bottom section 137 that converges inwardly into a generally flat bottom wall 138. The upper part or portion of side wall 126 has a rounded corner section 139 that merges into an upwardly directed concaved shaped top wall 141. Side wall 126 has a first or side upright handle 142 spanning a recess 143 of a size to accommodate the fingers of a hand. The handle 142 is located generally in the mid-section of side wall 126 opposite ribs 133-136. As seen in FIG. 15, recess 43 has a generally oval shape and extends in circumferential opposite directions on opposite sides of handle 142. The outer surface of handle 142 is concentric with the outer surface of side wall 126 to provide bottle 112 with an overall cylindrical configuration which minimizes packaging and retail shelf space.

Figure 18:
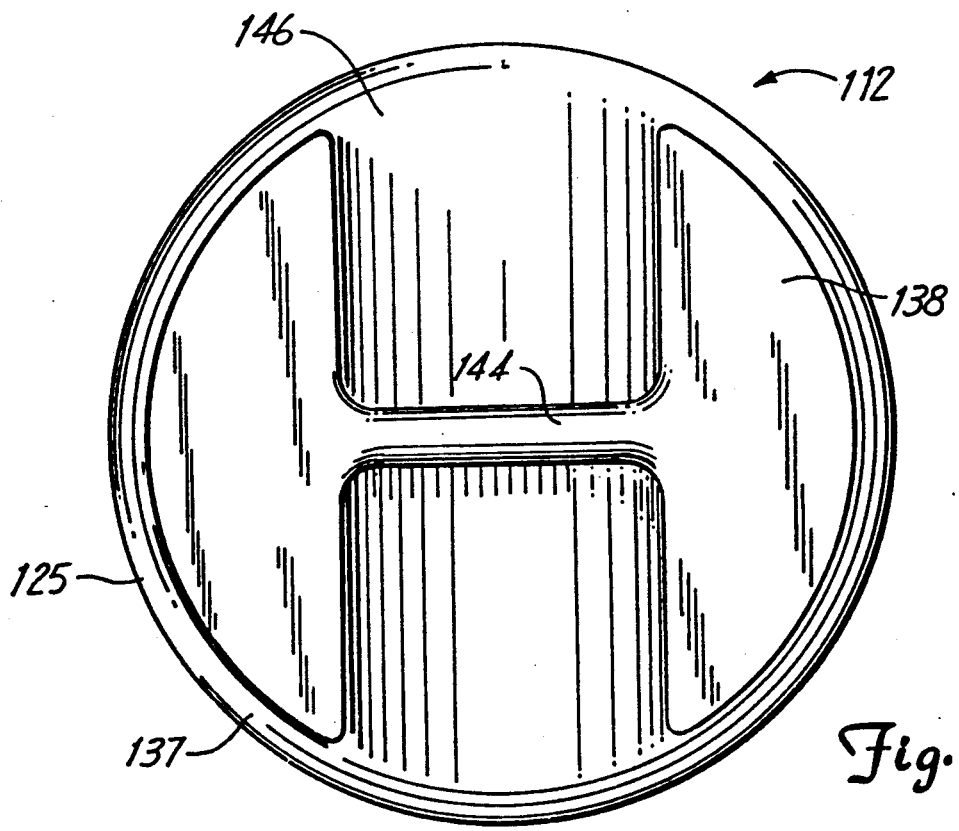
FIG. 18 is a bottom view of the bottle of FIG. 12.

Bottom wall 138 has a second or bottom handle 144 spanning a recess 146. As shown in FIG. 18, recess 146 extends diametrically across the bottom wall 138 providing open ends allowing access of the hand to handle 144 from either side of bottle 112. Returning to FIG. 12, handles 142 and 144 are located in the same vertical plane with handle 142 in an upright or vertical position and handle 144 in a horizontal or transverse position across the mid-section of bottom wall 138. Handles 142 and 144 are used to hand manipulate bottle 112 and aid in the inverting of the bottle 112 onto dispenser 10.

Figure 19:
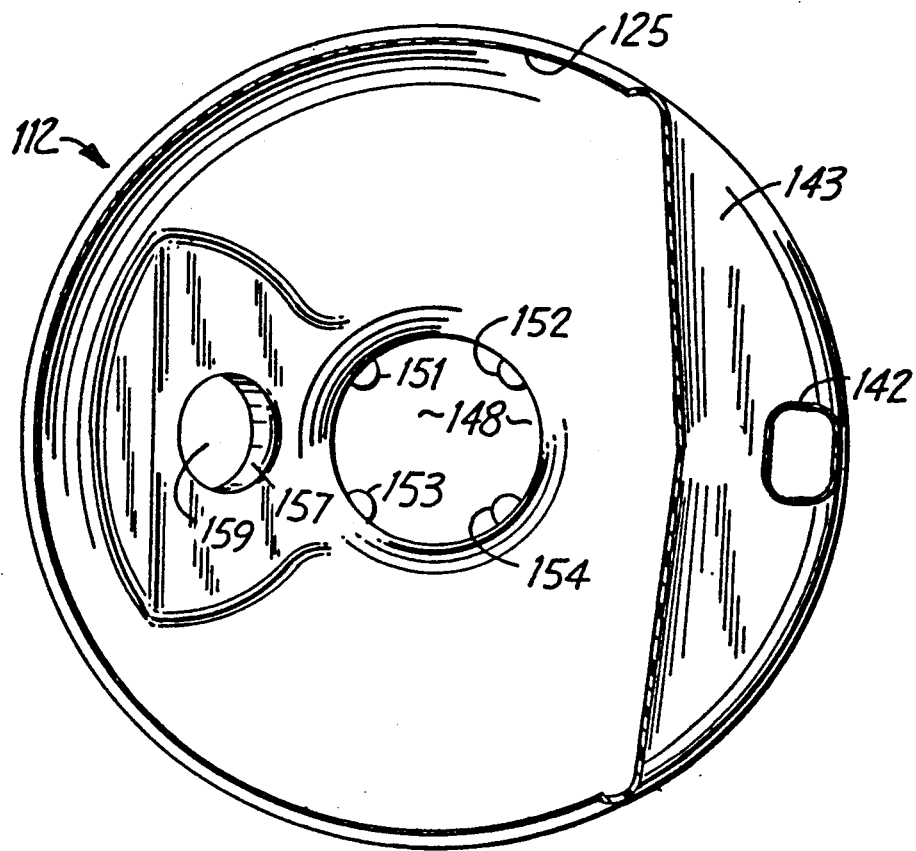
FIG. 19 is a sectional view taken along the line 19—19 of FIG. 14.
Figure 20:
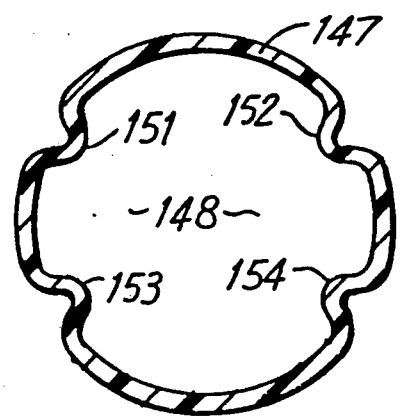
FIG. 20 is a sectional view taken along the line 20—20 of FIG. 15.

As shown in FIGS. 12, 13, 14, 15 and 16, top wall 141 extends upwardly and terminates in a generally cylindrical neck 147 surrounding an opening 148 into bottle chamber 162. Bottle 112 is shown in the inverted or dispensing position in FIG. 12. The outer portion of neck 147 has external threads 149. Neck 147 has a plurality of inwardly directed projections or fingers 151, 152, 153 and 154 which function as stops as hereinafter described. Projections 151-154, shown in FIGS. 19 and 20, are circumferentially spaced from each other and are located on opposite sides of neck 147. Projections 151-154 are integral with the plastic material of neck 147 and are formed during the blow molding process of making bottle 112.

Figure 14:
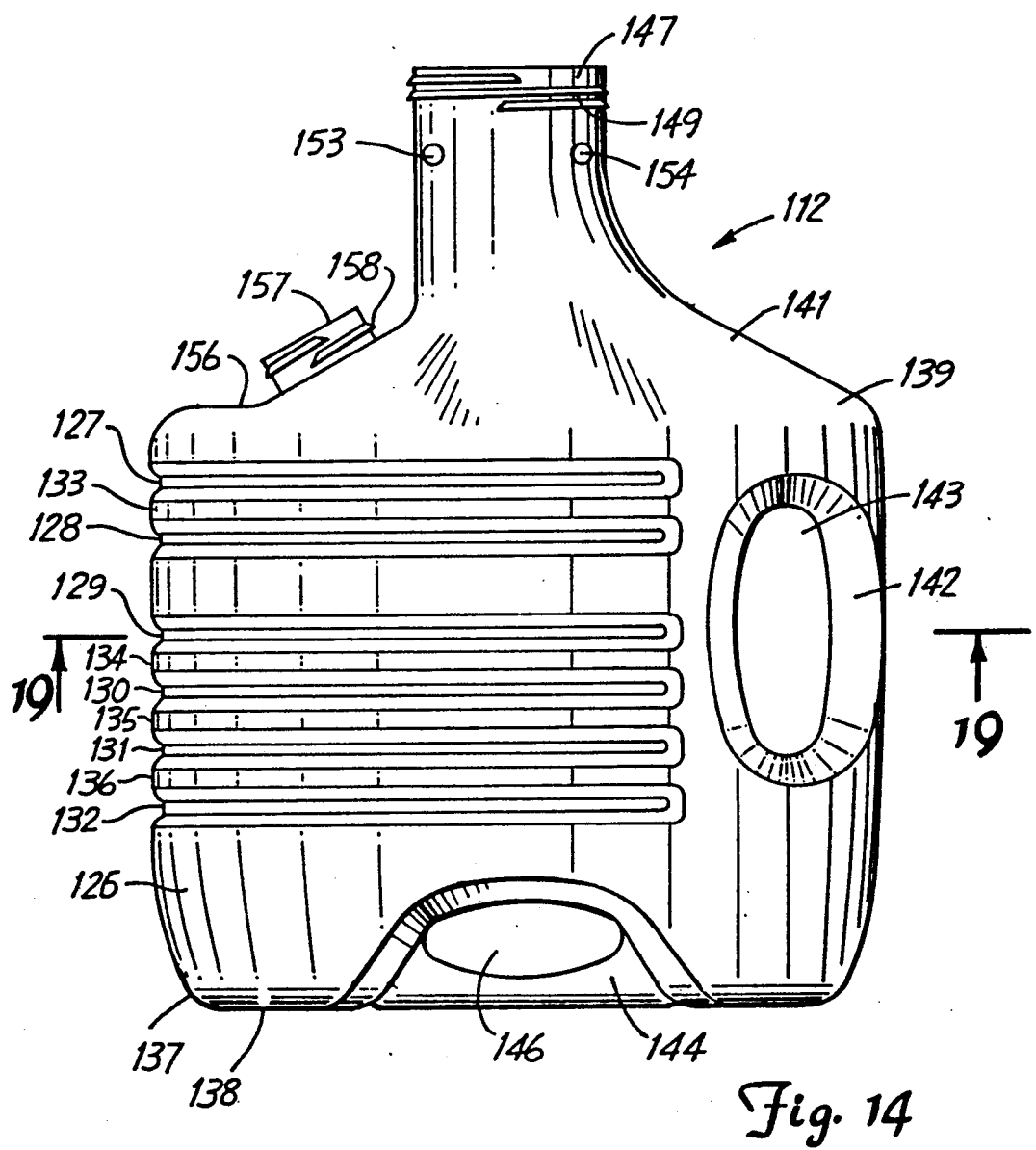
FIG. 14 is a side elevational view of the bottle of FIG. 12.
Figure 16:
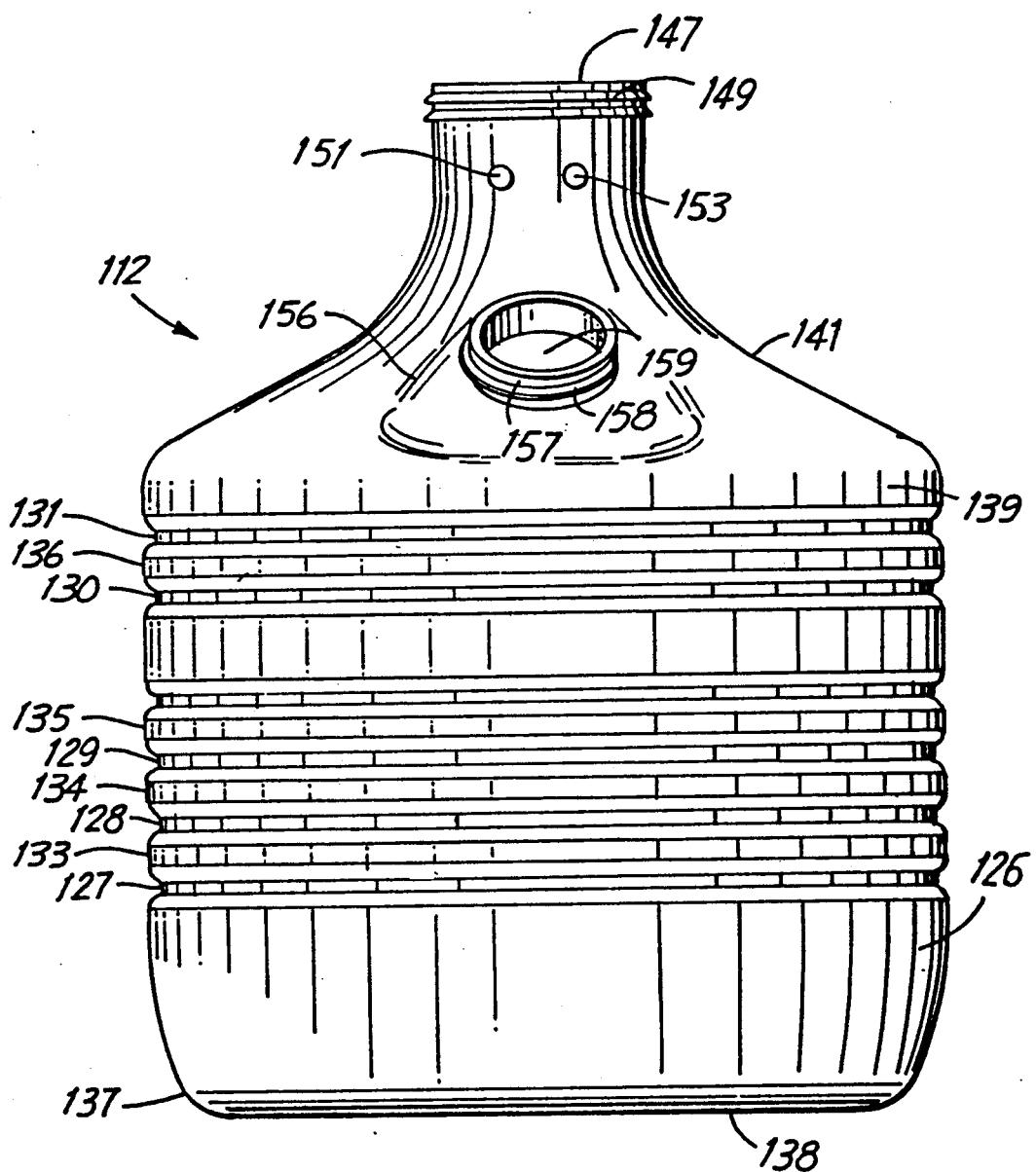
FIG. 16 is a front elevational view of the bottle of FIG. 14.
Figure 17:
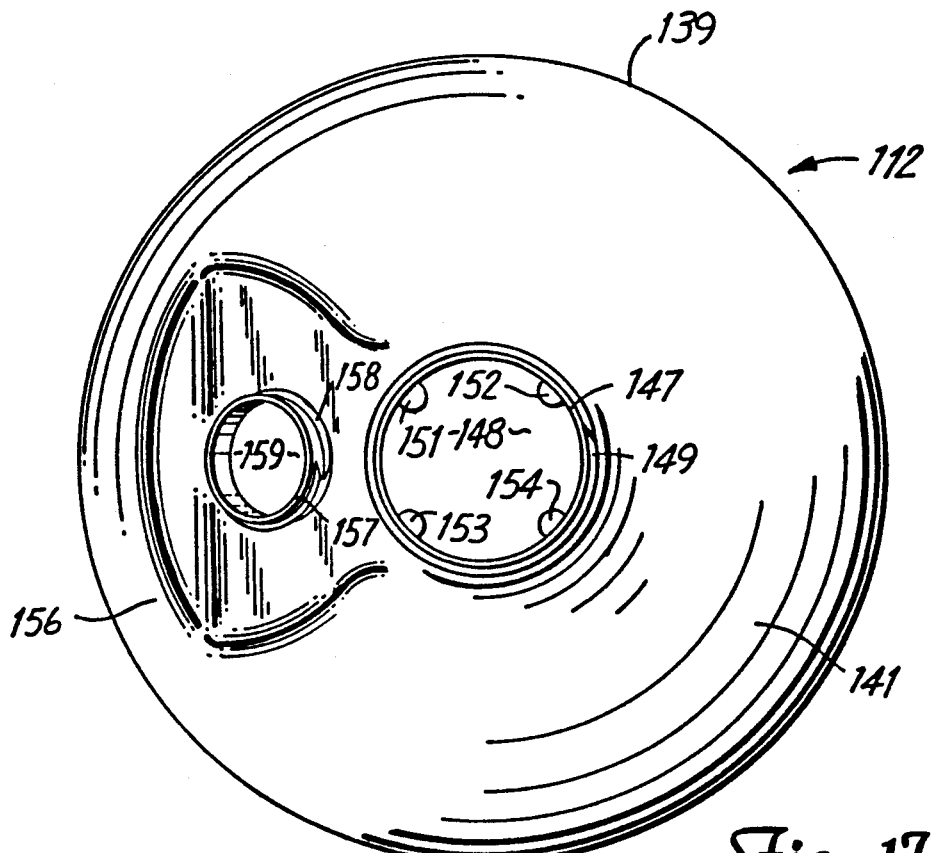
FIG. 17 is a top view of the bottle of FIG. 12.

Referring to FIGS. 14, 16 and 19, top wall 141 has a side recess 156 extending from corner section 139 upwardly toward the tubular neck 147. A mid-portion of recess 156 accommodates a short outwardly directed second neck or tubular member 157 having external threads 158. Neck 157 surrounds an opening or hole 159 open to the internal chamber 162 of bottle 112.

A cap, indicated generally at 161, is turned onto threads 158 to close hole 159 to retain water 163 within chamber 162. Cap 161 has the same structure and functions as cap 61 shown in FIGS. 5 and 6 which are incorporated herein by reference. Other types of caps can be used to close hole 159. Returning to FIG. 12, cap 161 and pointer 172 have a low profile to position cap 161 within recess 156 in top wall 141 as shown in broken lines. Cap 161 does not interfere with the annular surface engagement of top wall 141 on seal 23 whereby bottle 112 is firmly seated on seal 23.

Figure 13:
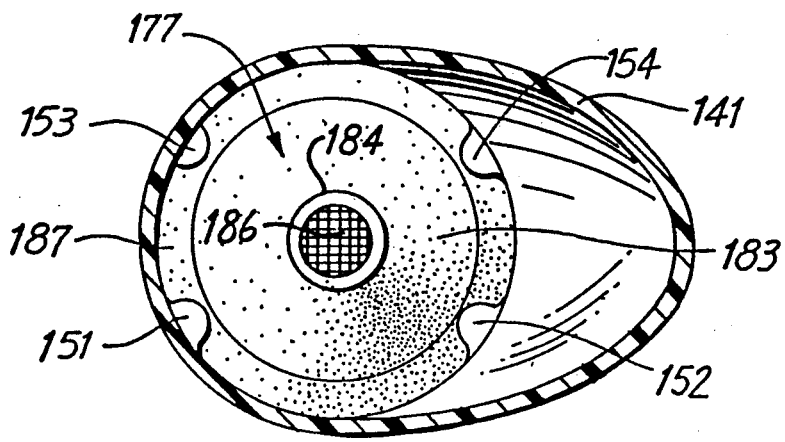
FIG. 13 is an enlarged sectional view taken along the line 13—13 of FIG. 12.

Returning to FIG. 12, filter 177 has the same shape and function as filter 77 shown in FIG. 3. The parts of filter 177 that correspond to the same parts of filter 77 have the same reference number with the prefix 1. Cylindrical casing 178 containing the filtering material 182 is closed with cover 183. Cover 183 has a flange 187 that engages projections 151, 152, 153 and 154 as seen in FIG. 13. Ring 188 turned onto neck 147 centers filter 177 on neck 147 and holds flange 187 in engagement with projections 151-154. Ring 188 can be removed from neck 147 to allow filter 177 to be removed from bottle 112 and replaced with a new filter.

Bottle 112 is used to supply filtered water to dispenser 10 the same as bottle 12. Cap 161 is removed from tubular member 157 to allow the bottle chamber 162 to be refilled with water without removing the filter from neck 147. Ring 188 can be removed from neck 147 to allow replacement of filter 177. In use the bottle 112 is inverted and supported on seal 23 of dispenser 10 as shown in FIG. 12. The water dispensing sequence is the same as bottle 12 and filter 77 herein described.

While there has been shown and described preferred embodiments of bottles having filter necks and accommodating liquid filters and fill necks closed with caps having refill counters, it is understood that changes in the structure, size, shapes, materials, and arrangement of structures can be made by those skilled in the art without departing from the invention. The invention is defined in the following claims.

We claim:

1. A bottle and a filter for storing a liquid usable with a liquid dispenser wherein the bottle is inverted on the dispenser to provide the dispenser with a supply of filtered liquid comprising: a side wall with a first end and a second end, a bottom wall jointed to the first end of the side wall, a top wall joined to the second end of the side wall, said side wall, bottom wall, and top wall surrounding a chamber for storing liquid, a first neck joined to the top wall having a passage open to the chamber and the dispenser, a filter for removing contaminants from the liquid, said first neck having an open end, a plurality of circumferentially spaced members projected into said passage inwardly of the open end for positioning the filter in said passage operable to remove contaminants from liquid flowing from the chamber through the filter into the dispenser, said filter having a side wall spaced inwardly from the first neck and annular means engagable with the projections to prevent the filter from being moved into the chamber of the bottle, means mounted on the first neck having an inside edge surrounding and engagable with the side wall of the filter to retain the filter on said first neck with the annular means in engagement with said projections, means for allowing air to flow into the chamber of the bottle during the flow of liquid from the bottle through said filter into the dispenser, and a second neck joined to the top wall adjacent the first neck, said second neck having an opening into the chamber to allow liquid to be placed in the chamber, said second neck having means accommodating cap means to close the opening therein.

2. The bottle and filter of claim 1 wherein: the first neck is longer than the second neck.

3. The bottle and filter of claim 1 wherein: the first neck includes a generally tubular wall surrounding said passage, and the second neck includes an annular wall surrounding said opening.

4. The bottle and filter of claim 3 wherein: the tubular wall has a diameter larger than the diameter of the annular wall.

5. The bottle and filter of claim 3 including: cap means releasably connected to the annular wall to close said opening.

6. The bottle and filter of claim 5 wherein: said cap means includes counter means operable to indicate the number of times that the chamber has been filled with liquid.

7. The bottle and filter of claim 6 wherein: the counter means includes a plurality of indicia, and a pointer movable to separate indicia indicating the number of times that the chamber has been filled with liquid.

8. The bottle and filter of claim 1 wherein: the first neck has a longitudinal axis, and the second neck has a longitudinal axis extended generally parallel to the longitudinal axis of the first neck.

9. The bottle of claim 8 wherein: the bottle has a central longitudinal axis, said longitudinal axes of the first neck and second neck being located on opposite sides of the central longitudinal axis of the bottle.

10. The bottle and filter of claim 1 wherein: said top wall having an annular surface portion surrounding the first and second necks for supporting said bottle when inverted in use.

11. The bottle and filter of claim 1 wherein: said top wall has a recess, said second neck being located entirely within said recess.

12. The bottle and filter of claim 1 wherein: the means for allowing air to flow into the chamber includes at least one air bleed passage open to the chamber and dispenser, said air bleed passage being closed with liquid in the dispenser and open when the level of liquid in the dispenser is below the air bleed passage thereby allowing air to flow through said air bleed passage into said chamber.

13. The bottle and filter of claim 1 wherein: said filter includes and inlet opening within the chamber, an outlet opening externally of the bottle, and liquid filtering material between the inlet and outlet openings for removing contaminants from liquid flowing through the filter.

14. The bottle and filter of claim 1 wherein: the means mounted on the first neck is a ring member releasably mounted on the first neck, said ring member having said inside edge engagable with the side wall of the filter to retain the filter on the first neck.

15. The bottle and filter of claim 14 wherein: the means for allowing air to flow into the chamber comprises at least one air bleed hole in said ring member open to the passage and dispenser to allow air to flow into the chamber of the bottle.

16. A bottle and a filter for storing a liquid usable with a liquid dispenser wherein the bottle is inverted on the dispenser to provide the dispenser with a supply of liquid, said bottle comprising: a side wall having a first end and a second end, a bottom wall jointed to the first end, a top wall joined to the second end, said side wall, bottom wall, and top wall defining a chamber for storing liquid, first means joined to the top wall having a passage open to the chamber, a filter having a side wall surrounding filtering material operable to remove contaminants from liquid flowing from the chamber through the filter into the dispenser, said first means having a passage open to the chamber and dispenser and at least one inwardly directed member located inwardly of the open end of said passage engagable with the filter to prevent the filter from moving into the chamber, means mounted on the first means having an inside edge surrounding and engagable with the side wall of the filter to retain the filter on the first means with the filter engagable with said member, means for allowing air to flow into the chamber of the bottle during the flow of liquid from the bottle through said filter into the dispenser, and second means joined to the top wall having an opening into the chamber to allow liquid to be placed in the chamber, said second means adapted to accommodate a cap to close the opening therein.

17. The bottle and filter of claim 16 wherein: the means allowing air to flow into the chamber includes at least one air bleed passage open to the chamber and dispenser, said air bleed passage being closed with liquid in the dispenser and open when the level of liquid in the dispenser is below the air bleed passage thereby allowing air to flow through said air bleed passage into said chamber.

18. The bottle and filter of claim 16 wherein: the first means includes a plurality of circumferentially spaced projections extended into said passage, said filter adapted to engage the projections to prevent the filter from being moved into the chamber.

19. The bottle and filter of claim 18 wherein: said filter has an outlet opening within the chamber, an outlet opening externally of the bottle, said filtering material located between the inlet and outlet openings for removing contaminants from liquid flowing through the filter, and an annular portion engagable with the projections to position the filter in the passage and prevent the filter from being moved into the chamber.

20. The bottle and filter of claim 21 wherein: the means for allowing air to flow into the chamber includes at least one air bleed hole in the means mounted on the first means open to the passage to allow air to flow into the chamber of the bottle.

21. The bottle and filter of claim 16 including: a cap releasably mounted on the second means to close the opening therein, and counter means on said cap operable to indicate the number of times that the chamber has been filled with liquid.

22. The bottle and filter of claim 21 wherein: the counter means includes a plurality of indicia, and a pointer movable to separate indicia indicating the number of times that the chamber has been filled with liquid.

23. The bottle and filter of claim 16 wherein: the top wall has a recess, said second means being entirely located within said recess.

24. The bottle and filter of claim 16 wherein: the first means is a first tubular neck having a longitudinal axis, and the second means is a second tubular neck having a longitudinal axis extended generally parallel to the longitudinal axis of the first tubular neck.

25. The bottle and filter of claim 24 wherein: the bottle has a central longitudinal axis, said axes of the first and second necks being located on opposite sides of the central longitudinal axis of the bottle, and said top wall having a surface portion surrounding the first and second tubular necks for supporting said bottle when inverted in use.

26. A bottle for storing a liquid usable with a liquid dispenser wherein the bottle is inverted on the dispenser to provide the dispenser with a supply of liquid, said bottle comprising: a substantially cylindrical body portion having a top wall, a bottom wall and a generally circumferential side wall surrounding a chamber for storing liquid, said side wall having an upper end, said top wall joined to and extended upwardly from the upper end of said side wall, said top wall having a curved concave configuration and of decreasing diameter upwardly from said side wall and a recess in a portion thereof, said top wall providing a rigidified surface for supporting said bottle when inverted in use, said top wall terminating in a neck having a passage open to the chamber, said neck having inwardly directed projection means for engaging a liquid filter having a side wall adapted to be located in said passage and preventing the filter from being moved into the chamber, means mounted on the neck having an inside edge surrounding and engagable with the side wall of the filter adapted to retain the filter on the neck with the filter in engagement with the projection means, means for allowing air to flow into the chamber of the bottle during the flow of liquid from the bottle through said filter into the dispenser, and tubular means joined to the top wall portion located in said recess having an opening to the chamber for filling the bottle with liquid, said tubular means adapted to accommodate a cap for closing said opening.

27. The bottle of claim 26 including: a cap mounted on the tubular mans to close the opening therein, said cap including counter means operable to indicate the number of times that the chamber has been filled with liquid.

28. The bottle of claim 26 including: a filter located within the passage of the neck, said filter having an inlet end open to the chamber, an outlet end open externally of the bottle, liquid filtering material between the inlet and outlet ends for removing contaminants from liquid flowing from the chamber through the filtering material into the dispenser, and an annular portion engagable with the projection means to position the filter in the passage and prevent the filter from being moved into the chamber, and said means mounted on the neck including a member releasably mounted on the neck and engagable with the filter to retain the filter on the neck with the annular portion engagable with the projection means.

29. The bottle and filter of claim 28 wherein: the means for allowing air to flow into the chamber of the bottle includes at least one air bleed hole in said member open to the dispenser and passage to allow air to flow into the chamber of the bottle.

30. The bottle and filter of claim 28 wherein: the member is a ring member having an inside edge engagable with the side wall of the filter to retain the filter on the neck.

31. A bottle for storing a liquid usable with a liquid dispenser wherein the bottle is inverted on the dispenser to provide the dispenser with a supply of liquid, said bottle comprising: a side wall with a first end and a second end, a bottom wall jointed to the first end of the side wall, a top wall joined to the second end of the side wall, said side wall, bottom wall, and top wall surrounding a chamber for storing liquid, and a neck joined to the top wall having a passage open to the chamber, said neck having projection means extended into the passage for positioning a filter having a side wall in said passage operable to remove contaminants from liquid flowing from the chamber through the filter into the dispenser, means mounted on the neck having an inside edge surrounding and engagable with the side wall of the filter adapted to retain the filter on the neck with the filter in engagement with the projection means, and means for allowing air to flow into the chamber of the bottle during the flow of liquid from the bottle through said filter into the dispenser.

32. The bottle and filter of claim 31 wherein: the projection means includes a plurality of circumferentially spaced projections extended into said passage, said filter having annular means to prevent the filter from being moved into the chamber of the bottle.

33. The bottle of claim 31 including: a filter located within said passage of the neck, said filter having an inlet opening within the chamber, an outlet opening externally of the bottle, liquid filtering material between the inlet and outlet openings for removing contaminants from liquid flowing through the filter, and an annular portion engagable with the projection means for positioning the filter in the passage to prevent the filter from being moved into the chamber, said means mounted on the neck engagable with the side wall of the filter to hold the filter in said passage with the annular portion thereof in engagement with the projection means for positioning the filter in the passage.

34. The bottle and filter of claim 32 wherein: the means mounted on the neck is a ring member releasably mounted on the neck, said ring member having an inside edge engagable with the side wall of the filer to retain the filter on the neck.

35. The bottle of claim 34 wherein: the means for allowing air to flow into the chamber includes at least one air bleed hole in said ring member open to the dispenser and passage to allow air to flow into the chamber of the bottle.

36. A bottle and a filter for storing a liquid usable with a liquid dispenser wherein the bottle is inverted on the dispenser to provide the dispenser with a supply of filtered liquid comprising: a bottle having a side wall with a first end and a second end, and a bottom wall jointed to the first end of the side wall, and a top wall joined to the second end of the side wall, said side wall, bottom wall, and top wall surrounding a chamber for storing liquid, neck means joined to the top wall having a passage open to the chamber and the dispenser, a filter for removing contaminants from the liquid flowing from said chamber through the filter into the dispenser, projection means on the neck means extended into said passage inwardly of the open end thereof for positioning the filter in said passage so that the filter removes contaminants from the liquid flowing from the chamber through the filter into the dispenser, said filter having a side wall spaced inwardly from the neck means and annular means extended outwardly of the side wall engagable with the projection means to prevent the filter from being moved into the chamber of the bottle, means mounted on the neck means having an inside edge shrouding and engagable with the side wall of the filter to retain the filter on said neck means with the annular means in engagement with said projection means, and means for allowing air to flow into the chamber of the bottle during the flow of liquid from the bottle through said filter into the dispenser.

37. The bottle of claim 36 wherein: the means for allowing air to flow into the chamber includes at least one air bleed passage open to the chamber and dispenser, said air bleed passage being closed with liquid in the dispsnser and open when the level of liquid in the dispenser is below the air bleed passage thereby allowing air to flow through said air bleed passage into said chamber.

38. The bottle and filter of claim 36 wherein: said filter included a housing having an inlet located within the chamber, an outlet opening externally of the bottle, and liquid filtering material within the housing between the inlet and outlet openings for removing contaminants from the liquid flowing through the filter, said housing having side wall engagable with the inside edge of the means mounted on the neck means to retain the filter on the neck means.

39. The bottle and filter of claim 36 wherein: the means mounted on the neck means is a ring member releasably mounted on the neck means, said ring member having said inside edge engagable with the side wall of the filter to retain the filter on the neck means, said means for allowing air to flow into the chamber comprises at least one air bleed hole in said ring member open to the passage and the dispenser to allow air to flow into the chamber of the bottle.

* * * * *